May 23, 1933.  S. E. BOUCHARD  1,910,743

TEMPLE FOR TRIAL FRAMES

Filed Oct. 23, 1929

Samuel E. Bouchard
INVENTOR

BY *G.A. Kellestad*
ATTORNEY

Patented May 23, 1933

1,910,743

UNITED STATES PATENT OFFICE

SAMUEL E. BOUCHARD, OF ROCHESTER, NEW YORK, ASSIGNOR TO BAUSCH & LOMB OPTICAL COMPANY, OF ROCHESTER, NEW YORK, A CORPORATION OF NEW YORK

TEMPLE FOR TRIAL FRAMES

Application filed October 23, 1929. Serial No. 401,695.

This invention relates to ophthalmic trial frames of the type used to hold test lenses before the eyes for the determination of refractive errors. More particularly the invention has reference to adjustable temples or bows which are used on trial frames of the character described.

One of the objects of my invention is to provide an adjustable temple which will be simple in structure yet capable of being readily adjusted to fit wearers having different facial characteristics. Another object is to provide a temple comprising two relatively movable members having an improved means for selectively retaining the members in adjusted position. Other objects and advantages reside in certain novel features of construction, arrangement and combination of parts as will hereinafter be more fully described and pointed out in the appended claim.

Referring to the drawing.

Figure 1:
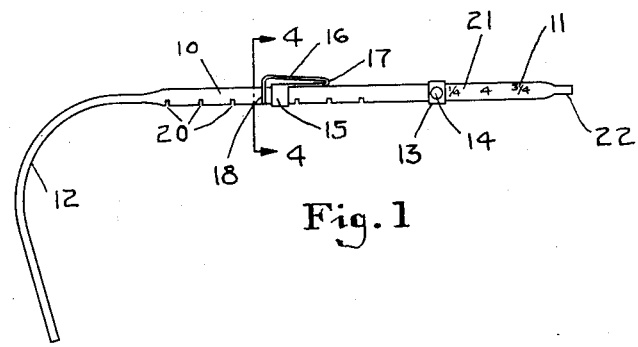
Fig. 1 shows a side elevation of a temple embodying my invention.
Figure 2:
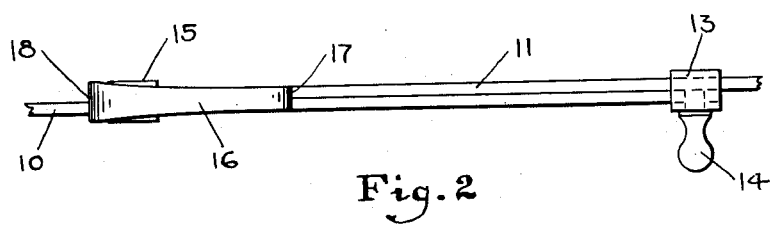
Fig. 2 shows an enlarged, fragmentary top view of the same.
Figure 3:
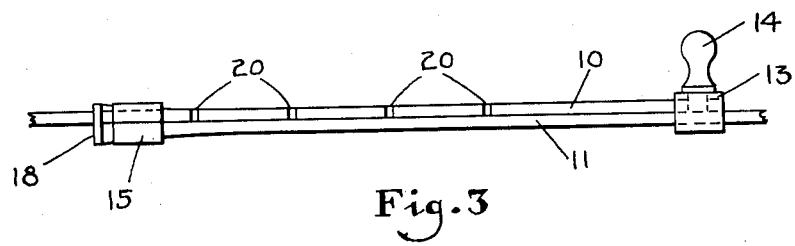
Fig. 3 is an enlarged, fragmentary view of the under side of the temple of Fig. 1.
Figure 4:
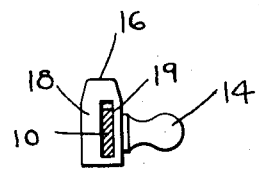
Fig. 4 is an enlarged sectional view taken on line 4—4.

A preferred form of my invention is shown in the drawing wherein 10 and 11 indicate, respectively, two members which are disposed adjacent to each other and adapted to be moved relatively to each other. One end of member 10 has a curved portion 12 adapted to engage the ear while fixedly secured to the other end of member 10 is the box member 13 having a knob or finger piece 14. Similarly fixed to one end of member 11 is the box member 15 which carries, integral therewith or otherwise secured, a spring member 16 having a loop 17 and a tongue 18.

The tongue 18 has an opening 19 through which the member 10 slidably passes. The lower side of member 10 is provided with a series of spaced notches 20 which are adapted for selective cooperation with the lower edge of opening 19. One side of member 11 is graduated or marked with figures 21 to indicate the length of the temple in its various adjusted positions, the edge of box member 13 serving as an index marker. The free end of member 11 is formed as at 22 to provide a hinge joint whereby the temple may be pivotally mounted on a trial frame. It will be understood, of course, that the member 10 slides freely through the box member 15 and the member 11 slides freely through the box member 13.

From the foregoing it will be apparent that I am able to attain the objects of my invention and provide an adjustable temple which will be simple in structure yet efficient in operation. To adjust the length of the temple it is only necessary to depress the spring member 16 and slide the members 10 and 11 relative to each other to any desired position, the length being indicated by scales 21. Modifications can obviously be made without departing from the scope of my invention as pointed out in the appended claim.

I claim:

A temple comprising two relatively slidable members, a reversely bent spring secured to one end of one member, said spring having a substantially vertically disposed tongue having an aperture, the other member having a flat shank which is slidably disposed in said aperture, the under side of said shank having a series of notches which selectively cooperate with the lower edge of the aperture.

SAMUEL E. BOUCHARD.